United States Patent
Ross et al.

[15] 3,697,205
[45] Oct. 10, 1972

[54] MOLD SYSTEM AND APPARATUS FOR PRODUCING A COMPOSITE PANEL

[72] Inventors: Richard J. Ross, Moraga; Harry X. Tjon, Fremont, both of Calif.

[73] Assignee: Kaiser Aluminum & Chemical Corporation, Oakland, Calif.

[22] Filed: July 2, 1969

[21] Appl. No.: 838,431

[52] U.S. Cl. ........................... 425/4, 425/122
[51] Int. Cl. ............................. B29d 27/00
[58] Field of Search .......... 18/4 B, 4 C, 4 P, 5 A, 5 P; 156/443

[56] References Cited

UNITED STATES PATENTS

| | | |
|---|---|---|
| 2,929,793 | 3/1960 | Hirsh .......................... 18/4 B X |
| 3,215,581 | 11/1965 | Carlson et al. ............ 18/4 B X |
| 3,262,151 | 7/1966 | Oxel ............................. 18/4 B |
| 3,313,010 | 4/1967 | Betz ......................... 18/4 B X |

*Primary Examiner*—Granville Y. Custer, Jr.
*Attorney*—James E. Toomey, Paul E. Calrow, Harold L. Jenkins and John S. Rhoades

[57] ABSTRACT

An improved mold system and apparatus for producing a composite building panel comprised primarily of a foam backed plank, wherein during manufacture of the panel means are provided for selectively applying and holding a moisture impervious envelope about a foamable backer material in such a fashion that the envelope can assist in molding the foamable material into the desired shape during the foaming and curing thereof and thereafter serve as a moisture impermeable membrane in the finished product.

20 Claims, 9 Drawing Figures

MOLD SYSTEM AND APPARATUS FOR PRODUCING A COMPOSITE PANEL

CROSS REFERENCE TO A RELATED APPLICATION

The instant system and apparatus can be used to fabricate the composite panels shown and described in U.S. Pat. No. 3,555,758 to Richard C. Schroter entitled "Panel and Sealed Joint Structure," granted Jan. 19, 1971.

BACKGROUND OF THE INVENTION

Various systems and apparatus have been devised in the past for producing composite panels comprised of a metal plank or the like to which a foamable material has been applied including composite panels that also have a moisture impermeable membrane secured to the foamable material. These prior systems and apparatus in some instances involved upper and lower endless conveyors respectively provided with lower and upper reaches that were disposed in superimposed relation to each other so as to define a traveling mold for receiving the cover layers of a panel to be formed and the foamable admixture interposed therebetween.

Such apparatus further included opposed edge dam devices, endless belts or the like for closing in the opposed sides of the traveling mold and they were arranged to engage opposed side portions of the panel cover layers as well as the foamable admixture during the foaming thereof to confine or keep the foamed core material within limits and between the cover layers of the panel being produced until the foamable material was fully cured. In many instances, however, the foamable material during forming and curing exuded or spilled out between the various cover layers and adhered to the opposed side edge dam elements. All of this resulted in side edge dam elements that required cleaning and in finally finished panels which had rough side edges in the area of the foamed core or insert which had to be trimmed, or sanded down, etc.

Typical prior art apparatus for forming laminated panels provided with a core made from a foamable admixture of the type under consideration and having the aforesaid deficiencies are illustrated by U.S. Pat. Nos. 3,215,581 to Carlson et al. and 2,929,793 to Hirsh.

SUMMARY OF THE INSTANT INVENTION

It is the primary purpose of the instant invention to provide an improved traveling mold system and apparatus made up of cooperating endless conveyors, and edge dam elements, etc., which are advantageously arranged to selectively apply and hold a moisture impermeable envelope in place about the foamable material portion of a composite foam backed panel element in an improved fashion whereby the envelope can materially assist the traveling mold elements in effecting the molding and curing of the foamable material.

BRIEF DESCRIPTION OF THE DRAWINGS

A brief description of the drawings is as follows:

FIG. 8 is a reduced fragmentary and perspective view of a modified form of composite panel that can be formed by the system and apparatus of the instant invention.

DETAILED DESCRIPTION

Figure 2:
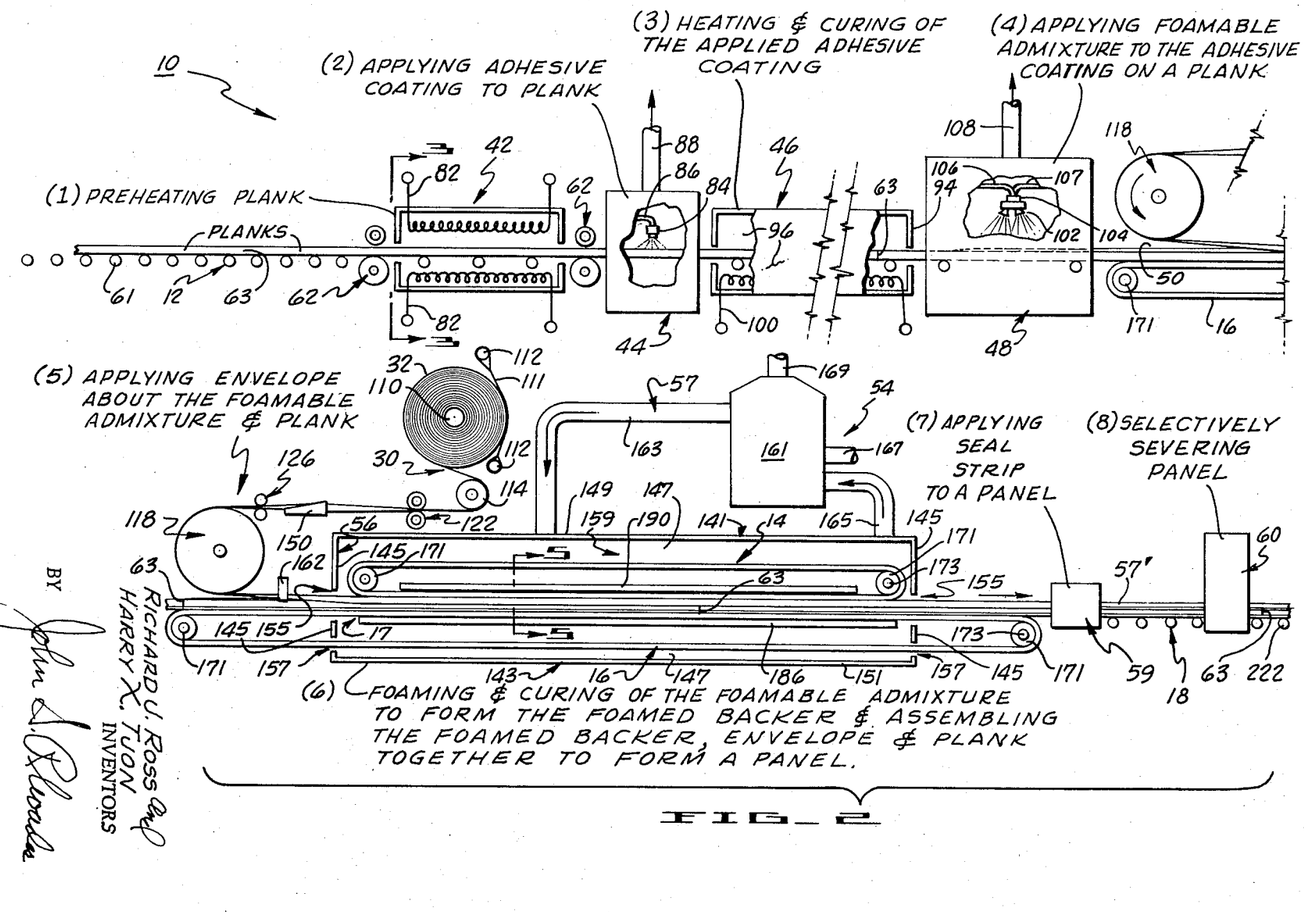
FIG. 2 is an overall schematic and diagrammatic view of a composite panel production line embodying the traveling mold apparatus and system of the instant invention.

With further reference to the drawings, a preferred form of production line that can be used to carry out the teachings of the instant invention, generally comprises an overall production line 10 made up of a number of different operative stations, such as the stations 1–8 of FIG. 2 generally interconnected with each other by way of a plank feeding and depositing conveyor 12, upper and lower endless conveyors 14 and 16 the respective lower and upper reaches of which are arranged in superimposed relation so as to define portions of a panel traveling mold 17 and a panel exiting conveyor 18.

Figures 1, 1A:
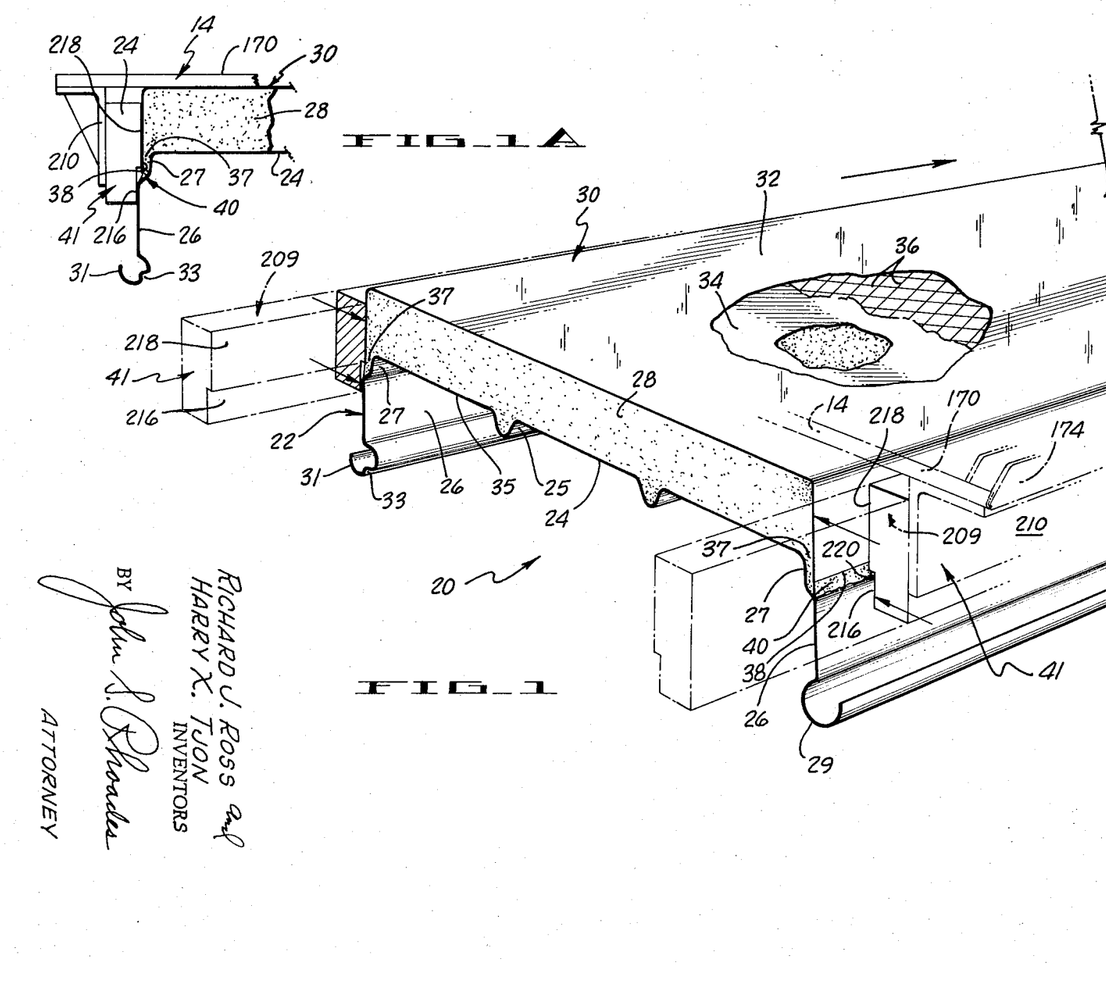
FIG. 1 is an enlarged broken, fragmentary and perspective view in dotted and solid lines of a typical composite panel that can be made by the traveling mold system and apparatus of the instant invention wherein certain elements of the apparatus are shown in phantom.
FIG. 1A is a fragmentary end elevation of a side edge portion of the panel of FIG. 1.

A preferred form of panel 20, that can be produced by the particular system and apparatus of the instant invention and as best shown in FIG. 1, generally comprises a roll-formed channel-shaped metal plank 22, a foamed backer 28 secured to the plank and a moisture impervious envelope 30 of readily foldable and formable material or materials covering the exterior or exposed surface portions of backer 28. Plane 22 can be of approximately channel-shaped configuration so as to be provided with a web 24 and a pair of opposed sides or flanges 26, which project from and at an angle to web 24. Web 24 of the plank can be provided with one or more longitudinally extending ribs 25. An indent or shoulder 27 can be provided at the junctions of web 24 and side flanges 26 on opposite sides of plank 22. The free marginal edge on one side 26 of plank 22 is curled inwardly and outwardly so as to define a deformable tubular sleeve 29. The free marginal side edge on the opposite side flange 26 of plank 22 is also curled inwardly and outwardly but in an opposite direction to define a tubular bead 31. If desired, the tubular bead can be indented so as to be provided with a capillary groove 33. The metal panels in effect can be of the type illustrated in U.S. Pat. No. 3,312,028 to Schroyer and the specially configured panel flanges are used to secure and interlock one panel to another panel of similar configuration in the fashion also illustrated in the aforesaid Schroyer patent.

Foamed backer 28 itself is preferably made from the reaction product of a foamable admixture 50 deposited in a preselected amount on the back side of the web of a plank 22 at one of the stations of production line 10 during formation of the panel. The foamable admixture can be a suitable grade of polyurethane or polystyrene and the like prepared in a manner well known in the art. Depending upon the building code requirements to be met by the composite panel 20, the foamable admixture 50 may include agents for enhancing the fire retardant or flame resistant characteristics of the reaction product or foamed backer 28. In order to facilitate adherence of the foamed backer, an appropriate heat resistant rubber base or neoprene base adhesive or primer coating 35 can be applied to the back of web 24 of the plank 22 prior to application of the foamable admixture. The foamable material 50 is also so controllably applied whereby it will form lip portions 37 that fill the voids in indents 27 of a plank during the formation of a composite panel.

The moisture impermeable facing or envelope 30 that covers the outer and side faces of the foam backer 28 is, as indicated in FIG. 1, preferably comprised of a three-ply laminate made up of an aluminum or an aluminum alloy foil 32, a suitable grade of Kraft paper 34 and a screen mesh 36 of natural or synthetic fibers such as those made of fiberglass that can be interposed between the foil and Kraft paper. Any suitable heat resistant adhesive material can be interposed between opposed faces of the Kraft paper and the foil to firmly bond the paper, foil and screen together in a known manner. The envelope or facing can be made in the form of an appropriate single ply of aluminum or aluminum alloy foil instead of the triple ply material shown.

Envelope 30 is selectively overlaid, folded about and held against the foamable admixture 50 on the back side of plank 22 in a unique fashion. In a preferred embodiment of the invention, the free longitudinal edges 38 of the envelope 30 are so located relative to a plank 22 that they are slightly spaced in the fashion shown in FIG. 1A from the area of juncture between indents 27 and adjoining sides 26. This means, among other things, that no special adhesive is required to secure the facing 30 to a metal plank 22 itself. This also results, as will be discussed more fully hereinafter, in the formation of small foam material filled gaps 40 between the envelope 30 and plank 22 on the opposed sides of a final composite panel. As indicated in FIGS. 1 and 1A, gaps 40 are relatively small and on the order, for example, of ⅛ inch to ¼ inch as compared to an overall height of 3 inches to 4 inches for a full side of a composite panel.

The production line diagrammatically shown in FIG. 2 will now be described with emphasis being given to the traveling mold system and apparatus portion thereof. Since the first four stations of the production line are of conventional design, only a brief discussion of the same is required.

Production begins with the successive disposition of roll-formed channel-shaped planks 22 in inverted positions on the powered roller conveyor 12. Conveyor 12 advances inverted planks along the longitudinally extending pathway through stations 1–4 of production line 10 as adjoining panels are disposed in inverted and in abutting end-to-end relation on conveyor 12.

Conveyor 12 advances each inverted plank firstly through a preheating oven 42 of conventional design at station 1. From oven 42 each plank 22 passes through a spray applicator booth 44 at station 2 where an adhesive coating 35 such as an acrylic is applied to the back side of web 24 of the plank. The plank 22 next passes to a second oven 46 at station 3 where the applied adhesive coating 35 is heated and cured. Thereafter, the adhesive coated plank is advanced past a second spray booth 48 at station 4 where a preselected amount of a foamable admixture 50 is initially deposited on the back side of web 24 of the plank 22. This admixture on curing ultimately becomes finished foamed backer 28.

Figures 3, 4:
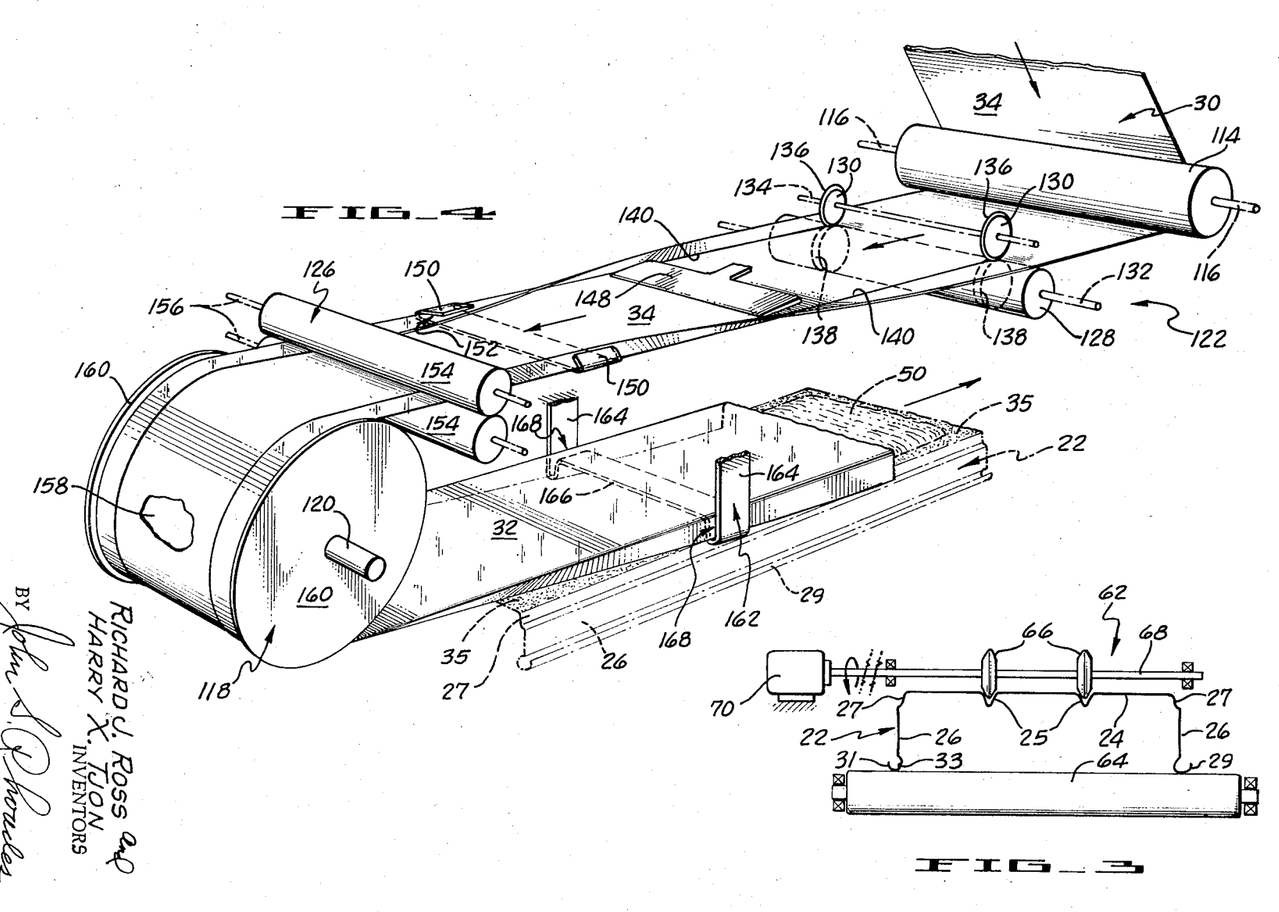
FIG. 3 is an enlarged sectional and diagrammatic view taken along 3—3 of FIG. 2 and with parts removed for the sake of clarity.
FIG. 4 is an enlarged, fragmentary and perspective view of the forward portion of the traveling mold apparatus of the instant invention and illustrates how the apparatus selectively folds and applies the envelope about a plank and the foamable admixture deposited on the plank in a continuous and progressive fashion.

If desired, conveyor 12 can have A pair of driving roll assemblies 62 associated therewith and these ROLL assemblies can be disposed adjacent the entrance and exit ends of oven 42 as depicted in FIGS. 1 and 3. Each driving roll assembly is generally comprised of a lower idler support roll 64 of larger diameter than a conveyor roll 61. Support roll 64 can be driven or can be simply an idler roll, as aforementioned in combination with a pair of somewhat disc shaped drive rolls 66 affixed in axially spaced relation to each other on a common shaft 68 journaled in a conventional fashion above the plane of conveyor 12. A drive motor 70 is affixed to one end of shaft 68 of each drive assembly 62.

Roll 64 engages the bead and sleeve portions of the flanges of an inverted plank 22 while drive rolls 66 fit into the openings formed by ribs 25 of the inverted planks 22. Drive rolls 66 of assemblies 62 are arranged relative to the mouth of traveling mold 17 so that they can line up planks 22 automatically with the mouth of the traveling mold. It is to be understood, of course, that drive rolls 66 of each drive assembly 62 can be mounted such that they are adjustable toward and away from their associated support roll 64 whereby the drive rolls 66 of each drive assembly 62 will be maintained in full driving engagement with a plank 22. Driving roll assemblies 62 act in conjunction with the idler or driven rolls 61 of conveyor 12 to propel successive planks 22 through stations 1–4 of the production line while at the same time initially aligning the foam covered planks with the traveling mold formed by conveyors 14, 16 and edge dams 41.

Oven 42 at station 1 and spray booth 44 at station 2 can be of conventional design with oven 42 being provided with electrical resistance radiant heating elements 82 or the like and spray booth 44 having a spray nozzle 84 disposed above the pathway of conveyor 12 which is supplied with adhesive coating 35 from a source under pressure. Booth 44 includes the usual ductwork 88 to vent fumes released during operation of nozzle 84 and the rate at which adhesive coating 35 is deposited on the back side of a plank 22 is, of course, adjusted in accordance with the rate of advancement of the individual planks. The oven at station 3 for curing the adhesive coating applied thereto at station 2 can be provided with an electrical resistance radiant heating element 100 disposed below the enclosed section of conveyor 12 at station 3.

At station 4, a foamable admixture of polyurethane composed essentially of a polyol and a polyisocyanate reactant is applied directly to the previously applied and cured adhesive coating 35 on the preheated plank by way of a conventional mixing and spray nozzle 102 disposed above the booth-enclosed section of conveyor 12. Spray nozzle 102 emits a conical spray of the foamable admixture 50. The spray at the base of the cone has a diameter approximating the width of the adhesively coated web on the back side of the inverted plank. The amount of foamable admixture 50 emitted by nozzle 102 is dependent primarily upon the rate of advancement of planks 22 on conveyor 12, as well as the depth and density desired for foam backer 28 to be formed by the reaction product of the foamable admixture upon the foaming and curing thereof at station 6 of apparatus 10. Appropriate inhibitors, foaming agents and the like can be premixed, as aforementioned, with the reactants supplied by conduits 106 and 107 in a known manner in order that the overall foamable admixture applied to the back side of the web of the plank will have optimum reactivity time characteristics of cream time, rise time and tack-free time for forming the foamed backer 28 of a panel 22 without adversely interfering with the overall operation of apparatus 10 in continuously forming composite panels. Exhaust duct 108 connected to booth 48 is used to exhaust fumes and other objectionable odors from the booth.

Ovens 42 and 46 and booths 44 and 48 are provided with the usual access doors for servicing, repair or adjustment of a nozzle or heating element as the case may be. After application of foamable admixture 50 at station 4 to a plank 22, the plank is advanced by conveyor 12 and deposited on lower conveyor 16 at station 5 where the plank begins its passage through the traveling mold system and apparatus portion of the production line or through stations 5–8.

In an advantageous embodiment of the invention, envelope 30 is selectively draped or applied at stations 5–6 in a continuous and progressive manner about the foamable admixture 50 and then held thereabout so as to assist the traveling mold conveyors 14 and 16 and side dams 41 in effecting an improved molding of the foamable admixture to a plank 22, all of which will now be described.

As indicated particularly in FIGS. 2 and 4, a coil of foil and paper laminate 30 mounted on an arbor 110 is unwound in a counterclockwise direction as viewed in FIG. 2. In order to regulate the rate of feed of envelope web 30, a band-type braking device 111 engageable with the coil is connected at its opposing ends to rods 112. These rods are connected to arms (not shown) and when the rod arms are actuated the band 111 can be pressed into appropriate braking engagement with coil 30 in order to regulate the continuous uncoiling thereof on arbor 110.

As the web of envelope material 30 is uncoiled, it is progressively and continuously passed about idler and directional rolls 114 and 118 and along a serpentine path. After leaving roll 118, envelope material 30 is next directed towards the moving planks 22 upon which a foamable admixture 50 has just been deposited and eventually merges with a back coated side of an inverted plank 22 as it continuously advances underneath apparatus 52 along the forward end of the upper reach of conveyor 16 toward the mouth of traveling mold 17.

As indicated in FIGS. 2 and 4, roll 114 is mounted on a shaft 116 disposed below the coiled envelope web on arbor 110. As viewed in the drawings, web material 30 moves clockwise about roll 114 and after passing roll 114, the opposite sides of web material 30 are engaged by the bottom bearing roll 128 mounted on shaft 132 and of greater width than web 30 and scoring rolls 130 adjustably mounted on shaft 134 which impress parallel fold or score lines 140 preferably on the paper laminate side of web 30 inwardly of the side edges thereof. The bearing surface of roll 128 is cut away to define a pair of annular score-like grooves 138. These grooves are adapted to receive the outer knife edge portion 136 of score line rolls 130, as rolls 130 are pressed by suitable means (not shown) against the web and into the grooves 138 to form the fold or score lines 140 on the laminate 30.

After fold lines 140 are impressed in paper-foil laminate 30, the laminate is passed below a stabilizing blade or squeegee-type device 148 which acts in conjunction with the C-shaped folding elements 150 provided with grooves 152 and located aft of blade 148 to cause a folding of the marginal edges of laminate 30 back upon the web 30 and about fold lines 140. This folding back of the marginal edges all takes place, of course, while the web 30 is continuously advanced under the proper tension and transverse pressure exerted by blade 148. This prefolding of the edges about fold lines 140 also guarantees that the marginal flanges of the final envelope 30 will be of the proper size and smooth surface in the finished composite panel 20. It is to be noted that the edge portions of folding elements 150 that face in the general direction of roll 114 are flared somewhat upwardly and outwardly in order to facilitate continuous introduction of the main body portion of the envelope web 30 between fold lines 140 into the recesses of the C-shaped molding elements as well as to facilitate sliding engagement of the opposed marginal edges of the envelope material 30 during the initial and partial folding thereof in elements 150.

From folding guides 150, web 30 passes through roll assembly 126 comprised of opposed idler rolls 154 mounted on shafts 156 disposed on opposed sides of the path of movement of folded envelope material 30. It is to be understood that shafts 156 are adjustably mounted relative to each other in order to increase or decrease the roll bite on opposed sides of the folded envelope so as to compress the folded sides of envelope 30 the proper amount against the remainder of the web of envelope 30 prior to passing envelope 30 about flanged guide roll 118 without tearing or otherwise damaging the folded envelope web 30.

Roll 118 includes an annular track section 158 only partially shown in the drawing and a pair of end flanges 160 of greater diameter than track section 158 suitably journaled on a shaft 120. The flanges of roll 118 serve to hold the envelope web material 30 in the proper position during the scoring and folding of the same and also act to line up the web 30 with the desired point of mergence of the web with the inverted and foam covered plank 22 as will now be described.

After the folded laminate envelope is passed counterclockwise about roll 118, as viewed in FIG. 2, with the foil side of the envelope 30 contacting roll 118, the overall laminate 30 is directed past a generally U-shaped unfolding device 162 aligned with roll 118.

Leg sections 164 of unfolding device 162 are suspended from suitable brackets (not shown) and the lower portions of these legs are reversely folded at their area of juncture with web section 166 so as to form envelope edge receiving slots or grooves 168 that are used to cause an unfolding of the marginal side edges of the envelope previously folded down about lines 140 all as previously described. The depth of a given groove 168 corresponds substantially or roughly to the width of an opposed marginal edge of the envelope web 30 and the distance between the grooves is substantially equal to the distance between fold lines 140 on the envelope web 30. By virtue of the paper side of the envelope being inverted by roll 118 so as to face downwardly, the edges of the envelope unfolded by device 162 will project in a downward and outward direction in the manner illustrated in FIG. 4 and with the entire envelope 30 also being fully supported by unfolding device 162.

Figures 5, 6:
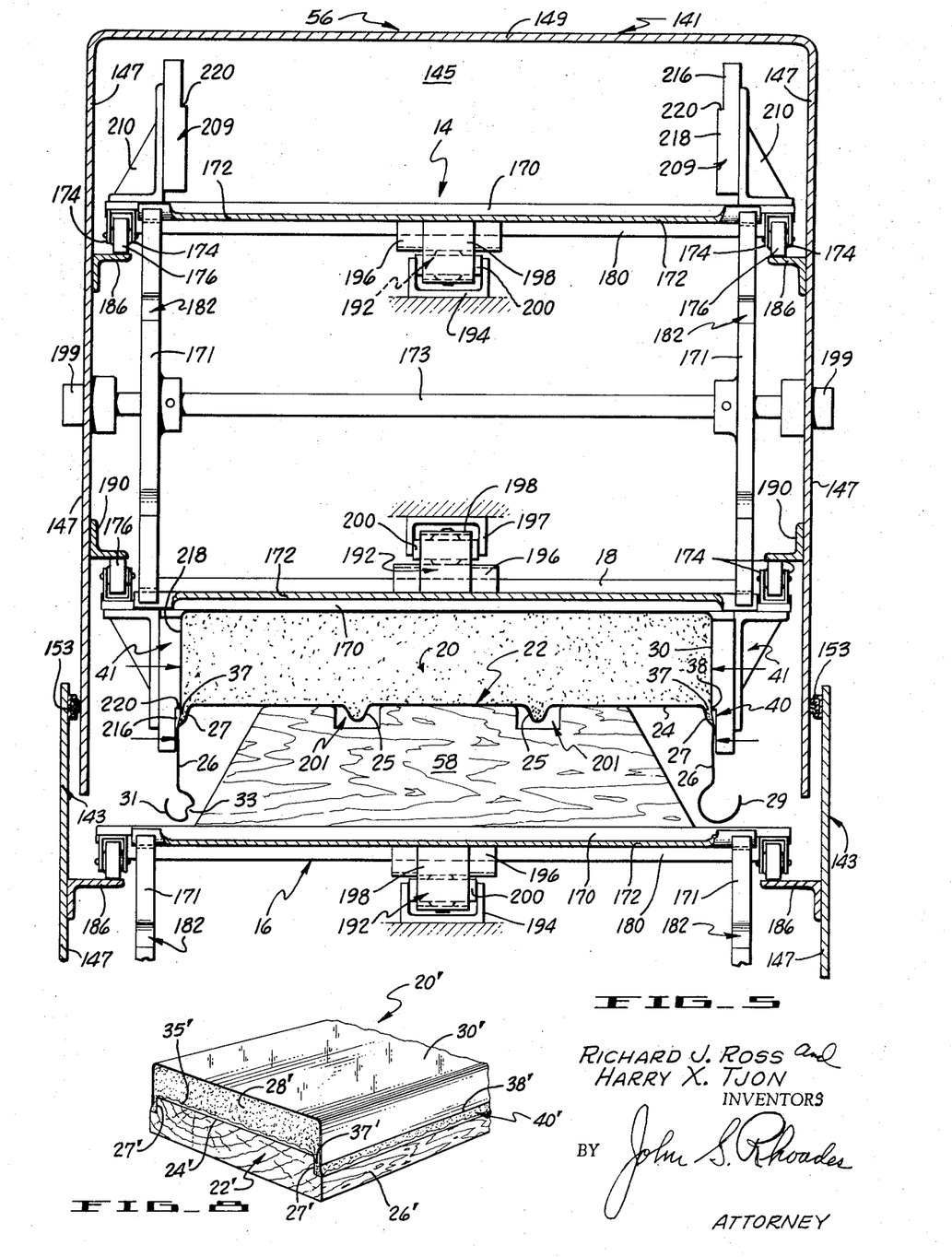
FIG. 5 is an enlarged cross-sectional view taken along line 5—5 of FIG. 2 with parts added and with parts removed.
FIG. 6 is an enlarged, fragmentary and perspective view in dotted and solid lines of certain portions of the apparatus of the instant invention.

Preshaped envelope 30, after passing the reopening and reshaping device 162, is eventually frictionally gripped by the lower reaches of upper conveyor 14 during the advancement of the lower and upper reaches respectively of upper and lower conveyors 14 and 16 and forced into engagement with the foamable admixture 50 on the back side of a plank 22. This frictional grippage of the leading portion of the preshaped envelope within and adjacent to the mouth of traveling mold 17 or the point of mergence of conveyors 14 and 16 not only maintains web 30 under sufficient tension to effect the continuous progressive forming of web 30 at station 5 in a unique fashion as aforedescribed but also provides for the continuous, progressive and controlled draping of preshaped envelope 30 about the back side of a plank 22 between stations 5–6 in a unique manner as indicated in FIGS. 2 and 4–6. By virtue of foamable admixture 50 having certain optimum reactivity-time characteristics, each successive portion of the foamable admixture deposited on the back side of a plank 22 usually will not have foamed to any measurable extent by the time each of these portions individually reaches the entrance to the mouth of traveling mold 17. This in turn means that there will be a lack of accumulation and back-up of foamable admixture at the entrance of traveling mold 17 that would otherwise tend to interfere with the frictional grippage and continuous progressive drape-like application of the leading portion of preshaped envelope 30 about the foamable admixture and back side of the plank as indicated in FIG. 5.

As the moving traveling mold 17 passes through housing 56, the residence time in housing 56 of the foamable material will be such that the foamable material comprising backer 28 is fully foamed, cured and secured to plank 20 while foil and paper laminate web 30 becomes attached to the foamed material to form a moisture impermeable facing for panel 20.

Housing 56 is advantageously made up of telescopingly arranged upper and lower hood sections 141 and 143 sealed by means of seal strip 153, and provided with the usual end and side walls 145 and 147 respectively. Section 141 also has a top 149 and the end wall sections of the housing include openings 155 and 157 for conveyor 16 as diagrammatically indicated in FIG. 2. The interior of housing 56 in effect constitutes a curing chamber or even 159 through which heated air is circulated in order to accelerate and promote foaming and final curing of foamable admixture 50.

A suitable forced air heating and ventilating system 57 that can be used for this purpose can comprise a combination forced air blower and gas-fired heater 161 for heating and circulating heated air through housing 56 together with the usual supply and return ducts 163, 165 and 167. Vent stack 169 is connected to the combined blower and heater for exhausting fumes and other objectionable odors, etc., generated during operation of system 57. Instead of a forced and heated air system for curing foamable mixture 50, other systems can be used such as electrical resistance heating, radiant heating and the like.

Figures 6, 7:
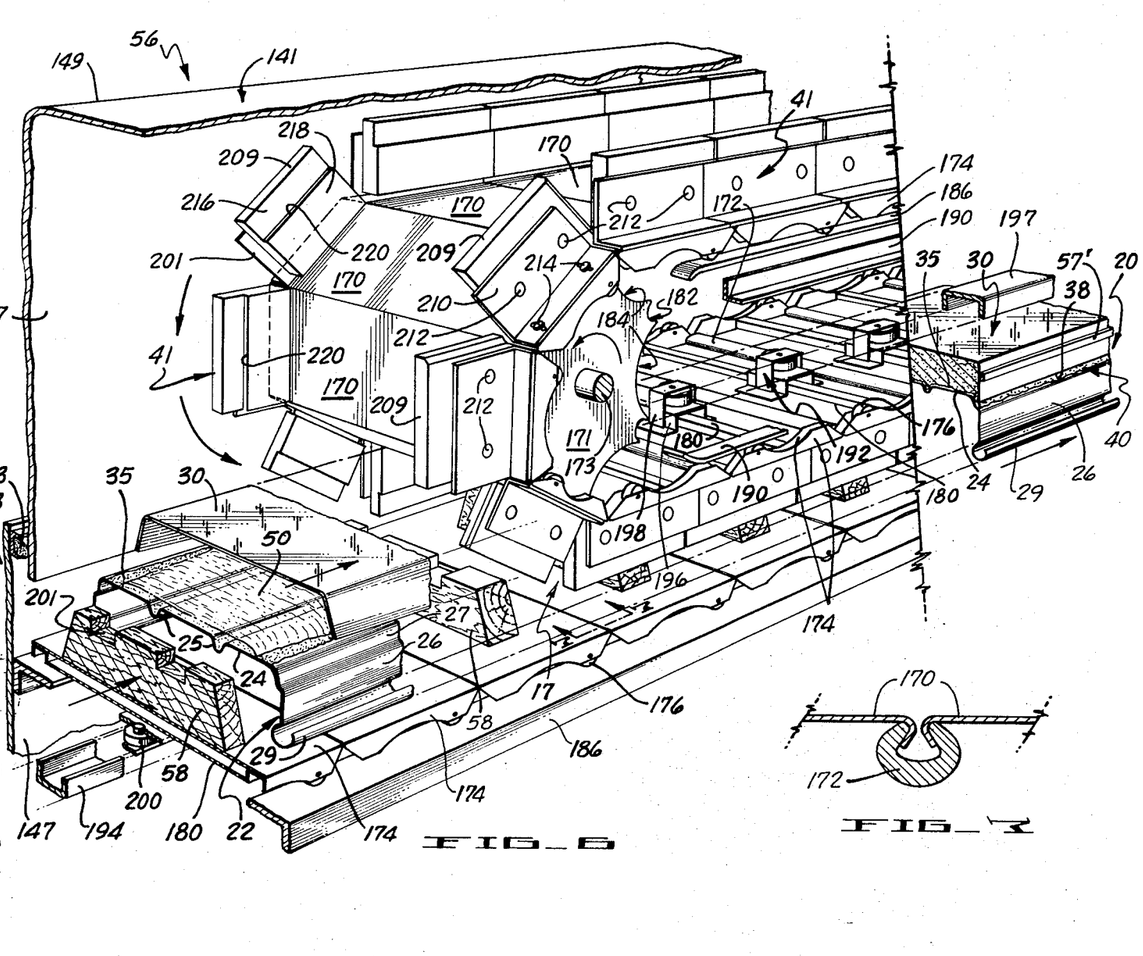
FIG. 7 is an enlarged cross-sectional view taken along line 7—7 of FIG. 6.

In general, upper and lower conveyors 14 and 16 are generally made up of similar individual flight elements arranged in the same fashion relative to each other unless otherwise specified with conveyor 16 being somewhat longer than conveyor 14. Thus a general description of the upper conveyor 14 will suffice for both conveyors 14 and 16. Upper endless conveyor 14 is comprised of a series of hingedly interconnected flight plates 170. The forward and trailing ends of each plate 170 are flanged in a downward and inward direction in the manner illustrated in FIG. 7 whereby they can be disposed within the C-shaped recess of a coupling bar 172. Each plate 170 is hingedly interconnected to an adjoining plate 170 by way of bars 172 until a continuous flexible and endless conveyor of the proper length has been formed that can be trained about driving sprockets 171. Affixed to the back side of each plate 170 adjacent each end thereof is a pair of parallel spaced legs 174 that serve to mount an idler wheel assembly 176. The ends of legs 174 are beveled in an inward and downward direction relative to the back side of their associated plates 170 as well as being partially cut away in a concave arcuate fashion along the bottom edges whereby these legs can adequately clear the conveyor drive sprockets 171 as the plates travel about their given endless path of movement. A reinforcing bar 180 is affixed to and carried by the backside of each plate 170.

The outer periphery of a sprocket 171 at either end of the conveyor is cut away so as to define a series of six small outwardly facing, radially disposed U-shaped grooves 182 equally spaced about the periphery of the sprocket. Adjacent grooves 182 are separated from each other by large concave grooves 184 of generous radii. As indicated in FIGS. 5 and 6, a pair of drive sprocket wheels 171 are affixed to each end of a shaft 173 with their small and large grooves 182 and 184 being fully aligned.

A guide wheel assembly 192 is secured to the back side of each plate 170 intermediate the wheel assemblies 176 thereof. Wheel assembly 192 is arranged so that as a given flight plate 170 contacts the sprocket wheels 171, bar 180 can fit within aligned openings 182 of a pair of sprockets 171 while guide wheel assembly 192 clears the sprocket wheels. By virtue of adjoining plates being freely hinged and coupled to each other, these plates can flex relative to each other and freely move about drive sprockets 171 at either end of the conveyor.

Conveyor 14 is provided with horizontally aligned track elements 186 disposed directly below the upper reaches of the conveyor and horizontally aligned track elements 190 disposed directly above the lower reaches of the conveyor. Similar track elements are used for the various reaches of conveyor 16 and these track elements in engaging wheels 176 of a flight plate 170 during advancement along the reaches of conveyor 14 and 16 serve to keep the conveyors in full alignment with each other.

Wheel assembly 192 can be made up of two generally channel-shaped strap elements 196 and 198 of different widths and a wheel 200 interposed and journalled between elements 196 and 198. Strap element 196 at its outer flanged ends is affixed to opposed back side portions of a given plate 170. The outer flanged ends of strap element 198 are disposed about and affixed to the inner flanged ends of element 196. At the same time, opposed webs of elements 196 and 198 are spaced from each other in order to receive a shaft that rotatably mounts wheel 200 between the opposed webs of straps 196 and 198, all as shown in FIGS. 5 and 6.

An upper guiding track element 194 of channel shape is arranged longitudinally of each conveyor 14 and 16 and is mounted in a conventional manner by brackets (not shown) attached to the sides of casing 56 and below the upper reaches thereof for rolling engagement with a wheel assembly 192 of a plate 170 during advancement of the plate along the upper reaches of the conveyor all as indicated in FIGS. 5 and 6. An inverted and lower track element 197 of channel shape is similarly arranged and anchored longitudinally of each conveyors 14 and 16 in an appropriate fashion above the lower reaches of the conveyors for receiving the wheels of assemblies 192 of plates 170 during advancement of the plates along the lower reaches thereof. Track elements 194 and 197 in conjunction with tracks 186 and 190 cooperate to also maintain flights or flight plates 170 in line as they move about certain portions of their endless paths.

Conveyor shafts 173 that carry sprockets 171 are mounted in conventional journals 199 in the walls of housing 56. A common drive mechanism (not shown) is connected in a conventional fashion to corresponding outer ends of upper and lower shafts 173 at the same end of upper and lower conveyors 14 and 16 whereby the lower and upper reaches of upper and lower conveyors 14 and 16 are advanced simultaneously at the same rate and in the same direction or to the right as viewed in FIG. 2. As various flight plates 170 of upper and lower conveyors 14 and 16 respectively merge and become horizontally aligned along the lower and upper reaches thereof, they advantageously define in combination with edge dam elements 41 an overall improved traveling mold that moves through housing 56.

The upper and lower conveyors are driven at appropriate speeds such that the lower flights of conveyor 14 and the upper flights of conveyor 16 in the area where the conveyor flight plates 170 form a travelling mold will properly mate with each other. Appropriate tensioning devices can be attached to the shafts 173 for the several sprocket elements 171 of the conveyors to take up any appreciable slack in the conveyors as such.

In this connection, journals 199 for sprockets 171 of the upper conveyor 14 may be located in elongated slots in hood 56.

In one advantageous embodiment of the invention, plank 22 can be additionally supported within the traveling molding by a series of spacer blocks 58. The series of blocks 58 are preferably made of wood having a trapezoidal shape. Blocks 58 can be secured to the outer surface of each flight plate 170 or alternate plates 170 of lower conveyor 16 and these blocks are adapted to fit within the inverted channel of plank 22 as the plank traverses the travelling mold. The height of each block 58 is the same and it is larger than the depth of a plank channel whereby the top of a block 58 can engage a web portion of the inverted plank and hold the plank flanges 26 in suspension and spaced relation to the other parts of the moving conveyor plates 170 as the plank 22 moves through casing 56. The upper parts of blocks 58 have cutouts 201 for receiving the ribs 25 of the planks. These cutouts in receiving the ribs 26 assist in keeping the planks in proper alignment with each other as they pass through the traveling mold 17.

Opposed dam devices 41 connected to the side edges of one of the conveyors such as the top conveyor 14 and interposed between the upper and lower reaches of lower and upper conveyors 14 and 16 advantageously close off opposite sides of traveling mold 17 in a unique manner. Each dam device is comprised of a stepped ironing block 209 and a short L-shaped bracket 210 for attaching block 209 to the side edge conveyor of a light plate 170. Ironing block 209 is preferably made up of a relatively friction-free material such as nylon or the like. Bracket 210 is directly affixed by screw assemblies 212 to the back side of a block 209 in such a fashion that the forward and trailing edges of the block are preferably offset of the forward and trailing edges of the bracket in the direction of advancement of the upper conveyor about its sprockets 171 at either end thereof, as indicated by an arrow in FIG. 6.

The small leg of bracket 210 is adjustably secured to one end of a plate 170 on one side of the upper conveyor by cap-screw assemblies 214 in such a manner that the inwardly facing ironing surface of block 209 is disposed in full planar alignment with similar inwardly facing ironing surfaces of adjoining blocks 209. The ironing surfaces of various blocks 209 on each side of conveyor 14 form in effect in the area of the traveling mold 17 a pair of opposed and substantially continuous and relatively smooth overall ironing surfaces for smoothly and simultaneously engaging the two opposed side edges of the foil and paper laminate facing 30 and for pressing these opposed side edges of the facing with just the right amount of pressure against the foamable mixture as it foams and finally cures in its passage through casing 56.

By virtue of adjacent trailing and leading edges of adjoining edge dam block assemblies 209 on each side of conveyor 14 being offset relative to each other, as aforedescribed, these trailing and leading edges of the block assemblies 209 will fully overlap and abut as the block assemblies on each side of conveyor 14 are passed through the areas of conveyor travel where the matching conveyor parts form the traveling mold 17. By virtue of this particular arrangement of elements 209 and flight plates 170 along the lower reaches of conveyor 14 they form in conjunction with conveyor 16 a mold which allows the foamable mixture 50 to fully foam and rise a selected amount while at the same time taking the shape of the cross-section of the mold formed by the aforesaid elements 209 and flight plates 170. The membrane 30 that fits in the mold advantageously acts as an impervious lining for the mold made up of elements 209 and 170 while at the same time being pressed into shape about the foamable material 50 that upon curing becomes the foamed backer 28.

The inwardly facing ironing surface of block 209 of a given block assembly is advantageously made up of stepped surface portions 216 and 218 and a longitudinally extending ledge 220. Lower ironing surface portion 218 of a block 209 is adapted to be disposed adjacent the outer face of the associated plate 170 of the upper conveyor and is offset laterally inward of upper ironing surface portion 216 thereof. The overall height of a block 209 is such that when the block is inverted along the lower reach of upper conveyor 14 each inverted ironing surface 218 of an ironing block 209 will properly selectively engage an unfolded side portion of an envelope 30, as envelope 30 is fed to and passes through traveling molding zone along with planks 22. Surface 218 also tucks or presses the envelope against the foamable admixture 50 as the mixture rises and cures while at the same time advantageously confining the admixture 50 within the traveling mold. Simultaneously each inverted ironing surface 216 of a block 209 along the lower reach of upper conveyor 14 will selectively engage an opposed side edge portion of a plank 22 adjacent the back side thereof.

The forward part of a conveyor 14 is so arranged relative to the envelope applicator bar 162 and the entrance to housing 56 whereby the edge dam elements 41 and the conveyor flights 170 of conveyors 14 and 16 form the traveling mold promptly after successive portions of the envelope 30 have been brought into engagement with planks 22. In other words, the traveling mold is formed substantially as soon as the foamable admixture is subjected to heat for final foaming and curing purposes. During the final foaming and rising of material 50 and curing of the same to form the rigid backer 28 of the final product, envelope 30 advantageously surrounds admixture 50 being held in place by the ironing surfaces of the edge dam elements 209. Also during foaming and curing of foamable admixture 50 as it forms foamed backer 28 within the traveling mold, the inverted ironing surfaces 218 of certain block assemblies 209 on opposed sides of the moving mold, plates 170 along the lower reach of upper conveyor 14 and the back side of a plank 22, all cooperate to resist the outward pressure exerted by foamable admixture 50 as it foams and cures under the influence of heat. As admixture 50 foams and rises, it causes the opposed side edges of envelope 30 during continuous and progressive application of the envelope about the foamable admixture as aforedescribed to be urged outwardly and to be brought into contact with ironing surfaces 218 which press or iron out the wrinkles in the envelope 30 while at the same time pressing the envelope into locking engagement with the finally foamed backer material 28. The marginal edges 38 of the flange of facing 30 are also forced downwardly and inside the planes of side flanges 26 of plank 20 and below the plane of web 24 of a plank 22. During this foaming and curing of foam backer material 28, the opposed side edges of envelope 30 as they become fully distended and ironed cause overlapment of marginal edges 38 thereof relative to opposed side edges of plank 22 at indents 27 thereof. The particular planar disposition of the sides of facing 30 and overlap of the indents by the opposed marginal edges 38 of a facing or membrane 30 in effect means that the side edges of facing 30 will act as effective barriers that controllably confine outward exuding or flow of the foamable admixture in a direction only through the relatively small gaps 40 between marginal edges 38 and indents 27.

Whatever excess foamable admixture exists is thus discharged downwardly and controllably channelled into gaps 40 caused by indents 27 at their point of intersection with the web and a channel flange of plank 22. This excess foamable admixture advantageously forms foamed lip portions 37 on opposed sides of foamed backer 28. A lip portion 37 in effect during its formation carries or drains off substantially all excess foamable admixture. By virtue of the fact that a lip 37 generally takes up the excess material and the further fact that a marginal edge 38 of membrane 30 is finally disposed in the product being formed well below instep 220 of the edge dams and the plane of web 24 of plank 22, the marginal edge of facing 30 causes the formation of a substantially continuous and full impervious barrier or liner between the moving parts of conveyors 14 and 16 in the area where they form a traveling mold and the foamable admixture so that the admixture 50 is substantially maintained fully within the traveling mold 17 until it is fully foamed and cured and without its deleteriously exuding out of the mold to otherwise contaminate, coat and foul various moving parts of the traveling mold. Thus, the foil and paper membrane 30 in effect prevents the foamable material from sticking to the traveling mold elements in addition to having other advantageous functions while also aiding the mold elements in controlling the flow of excess material.

Depending upon the preselected amount of the foamable admixture deposited at station 4 and depending upon whether gaps 40 are desired on opposite sides of the composite panel being produced, envelope 30 of a panel may be folded and applied in overlapped relationship about the opposed sides of a plank whereby no gaps of any kind are formed between membrane 30 and side flanges 26. Plank 22 could also be unindented at the areas where the opposed sides of the envelope are tucked into overlapping engagement with the opposed sides thereof.

As the composite panels exit from the traveling mold at station 6, they are deposited on an exiting conveyor 18 comprised of a series of longitudinally spaced idler rolls 222 for final advancement through stations 7 and 8 of FIG. 2. Disposed adjacent conveyor 18 at station 7 is a suitable seal tape applicator device 59. This device which can be a roller device or the like that adhesively applies a seal strip 57' to a selected portion of one side of the composite panel in the manner illustrated for example in FIG. 6. In the event that planks 22 are continuously roll-formed at the entry end of the production line from continuously advancing coil stock, then, at station 8, a flying cutter apparatus 60 of appropriate design is provided for selectively cutting the continuously produced composite panel into the desired sectional lengths that become arranged in end-to-end abutment 63 as they pass along the production line. Thus, although apparatus 10 has been described in connection with depositing a series of planks at the inlet of conveyor 12, a roll former could be mounted adjacent the inlet end of conveyor 12 for rolling a length of uncoiled sheet into a plank and for feeding and depositing the roll-formed plank onto the inlet end of conveyor 12.

Although opposed dam elements 41 have been shown and described as affixed to upper conveyor 14, they could be affixed to lower conveyor 16 instead of conveyor 14. Upper and lower conveyors 14 and 16 can be adjustably mounted relative to each other so as to adjust the height of the tunnel mold in order that panels having insulation backers of different thickness can be produced. Similarly, the opposed dam devices, as aforementioned, are adjustably mounted in order to enable production of panels of different widths. Moreover, envelope 30 can be formed from other suitable materials such as a length of a plastic sheet made up of a polyvinyl material and the like.

In one advantageous embodiment of apparatus 10, ovens 42 and 46 can be heated to a temperature level sufficient to preheat plank 22 to a temperature on the order of 120° to 150° F. At the same time conveyors 12, 14 and 16 can be advanced to the right as viewed in FIG. 2 at a rate of about 25 feet per minute and an admixture 50 deposited at the rate of approximately 10 lbs. per minute in order to form an insulation backer approximately 2 inches thick between an envelope and plank of approximately 12 inches in width. A suitable coating of acrylic adhesive can be applied at station 2 and the heating and ventilating system can supply air at about 2 pounds pressure above atmospheric pressure and at a temperature of about 175° F.

As indicated in FIG. 8, a modified panel 20' can be continuously produced by apparatus 10. Panel 20' is comprised of a solid plank 22' having an indent 27' at the point of juncture between an opposed side 26' and a foamed covered backface 30'. Panel 20' is otherwise provided with the same basic elements as panel 20 and they are identified by prime numerals.

Advantageous embodiments of the invention have been shown and described. It will be obvious to those skilled in the art that various changes and modifications can be made therein without departing from the scope thereof as set forth in the appended claims, wherein:

What is claimed is:

1. In a system for producing a composite panel comprised of a plank, a foamed backer affixed to the back face of said plank and an envelope of moisture impermeable material covering the exterior surface portions of said backer, the combination of endless upper and lower conveyors disposed in superimposed relation to each other with the lower and upper reaches of the upper and lower conveyors respectively arranged to form a traveling mold for curing and finally molding into shape a foamable admixture that forms the said backer, means for applying a foamable admixture in preselected amounts to the back face of said plank, means for feeding the plank covered with the foamable admixture toward the said traveling mold, means disposed adjacent the entry end of the traveling mold for directing an envelope towards and then folding the said envelope including the opposed side edges thereof about the foamable admixture on the back face of said plank in a continuous and progressive fashion, means for actuating said conveyors, and means on said conveyors cooperating to form the traveling mold, said last mentioned means including flights on the conveyors and opposing side edge dam elements affixed to the flights of one of the conveyors and provided with portions for simultaneously engaging the opposed side edges of both said envelope and said plank in order to iron the envelope into place against the foamable admixture during the curing of the admixture in said mold and for holding the opposed side edges of said envelope in a predetermined overlapped relation relative to certain portions of said plank so as to control the flow of the excess backer forming material in a direction away from said plank.

2. In a system as set forth in claim 1 including means for preheating said plank prior to introduction of said plank into said traveling mold.

3. In a system as set forth in claim 1 in which said foamable admixture applying means comprises a spray device.

4. In a system as set forth in claim 1 including means for applying an adhesive coating to the back face of said plank prior to the application of the foamable admixture thereto in order to assist in the attachment of the foamable admixture thereto.

5. In a system as set forth in claim 4 including means for curing said adhesive coating.

6. In a system as set forth in claim 1 wherein said conveyors are provided with track means for holding the conveyors in alignment with each other.

7. In a system as set forth in claim 1 wherein each of said edge dam elements is secured to a separate conveyor flight and wherein portions of adjoining edge dam elements are advanced in overlapping relationship.

8. In a system as set forth in claim 1 in which each of said edge dam elements includes stepped ironing surfaces.

9. In a system as set forth in claim 8 in which the ironing surfaces of an edge dam element face inwardly and are disposed at an angle to the conveyor flight to which it is attached.

10. In a system as set forth in claim 1 in which said envelope directing means includes roll means for scoring said envelope so as to facilitate the folding of the edges thereof about the foamable admixture.

11. In a system for producing a composite panel and the like comprised of a channel-shaped metal plank, a foamed backer affixed to the back face of the plank web and an envelope of moisture impermeable material covering the exterior surface portions of said backer, the combination of endless upper and lower conveyors disposed in superimposed relation to each other with the lower and upper reaches of the upper and lower conveyors respectively arranged to form a traveling mold for curing and finally molding into shape a foamable admixture that forms said backer, means for applying a foamable admixture in preselected amounts to the back face of the web of said plank, means for feeding the plank covered with the admixture and in an inverted condition toward the mold, means disposed adjacent the entry end of the traveling mold for directing the envelope towards and then folding the said envelope about the foamable admixture on the back face of the web of the inverted plank in a continuous and progressive fashion, means for actuating said conveyors, means on said conveyors cooperating to form the traveling mold and said last mentioned means including flights on the conveyors and opposing side edge dam elements affixed to the flights on one of the conveyors and provided with portions for simultaneously engaging the opposed side edges of both the envelope and said plank in order to iron the envelope into place against the foamable admixture during curing of the same in said mold and for holding the opposed side edges of said envelope in a predetermined overlapped relation relative to certain portions of said plank so as to control the flow of the excess backer forming material in a direction away from said plank and spacer means on one of the conveyors for contacting certain portions of the plank.

12. In a system as set forth in claim 11 including means for preheating said plank prior to introduction of said plank into said mold.

13. In a system as set forth in claim 11 in which the foamable admixture applying means comprises a spray device.

14. In a system as set forth in claim 11 including means for applying an adhesive coating to the back face of the web of said plank prior to the application of the foamable admixture thereto in order to assist in the application of the foamable admixture to the back face thereof.

15. In a system as set forth in claim 14 including means for curing the adhesive coating.

16. In a system as set forth in claim 11 wherein each of the said conveyors are provided with track means for holding the conveyors in alignment with each other.

17. In a system as set forth in claim 11 wherein each of the side edge dam elements is secured to a separate conveyor flight and wherein portions of the adjoining edge dam elements are arranged in overlapping relationship.

18. In a system as set forth in claim 17 wherein an edge dam element includes stepped ironing surfaces.

19. In a system as set forth in claim 18 wherein the ironing surfaces of the edge dam element face inwardly and are disposed at an angle to the conveyor flight to which it is attached.

20. In a system as set forth in claim 11 in which the envelope directing means includes roll means for scoring the envelope so as to facilitate the folding of the side edges thereof about the foamable admixture.

* * * * *